United States Patent
Lin et al.

(10) Patent No.: US 8,720,878 B2
(45) Date of Patent: May 13, 2014

(54) POSITIONING DEVICE

(75) Inventors: Dong-Sheng Lin, Taipei Hsien (TW);
Tzyy-Chyi Tsai, Taipei Hsien (TW);
Yun-Qing Jiang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 634 days.

(21) Appl. No.: 12/981,465

(22) Filed: Dec. 29, 2010

(65) Prior Publication Data
US 2011/0285068 A1  Nov. 24, 2011

(30) Foreign Application Priority Data
May 21, 2010  (CN) .......................... 2010 1 0179201

(51) Int. Cl.
*B23Q 3/00* (2006.01)
(52) U.S. Cl.
USPC ........................................ 269/289 R; 269/56

(58) Field of Classification Search
USPC .................... 269/289 R, 309, 310, 8; 279/2.2
See application file for complete search history.

(56) References Cited

U.S. PATENT DOCUMENTS 5,094,311 A * 3/1992 Akeel .......................... 180/119

* cited by examiner

*Primary Examiner* — Lee D Wilson
*Assistant Examiner* — Jamal Daniel
(74) *Attorney, Agent, or Firm* — Novak Druce Connolly Bove + Quigg LLP

(57) ABSTRACT

A positioning device includes a base, a supporting member, a fixing member, a first electromagnetic clutch, an engaging member, and at least one guide member. The base defines at least one hole. The supporting member is configured to support a workpiece. The supporting member and the fixing member are at the opposite sides of the base. The first electromagnetic clutch is disposed on a side of the base adjacent to the fixing member. The engaging member configured to be attracted by the first electromagnetic clutch is disposed on a side of the fixing member adjacent to the base and corresponds to the first electromagnetic clutch. An end of the at least one guide member is fixed to the fixing member, and an opposite end of the fixing member passes through the at least one hole and is fixed to the supporting member.

9 Claims, 6 Drawing Sheets

POSITIONING DEVICE

BACKGROUND

1. Technical Field

The present disclosure relates to fabrication technologies and, more particularly, to a positioning device used in fabrication of a liquid crystal display panel.

2. Description of Related Art

During fabrication of a liquid crystal display panel, two glass sheets are attached together. The process is implemented in a vacuum to prevent air bubbles from forming between the sheets.

A typical vacuum laminator includes a first grasping member, a second grasping member, and an alignment assembly. The alignment assembly can move parallel to an X-axis, and a Y-axis, and can be rotated in an angle θ defined by the X-axis relative to the Y-axis. In the laminating process, the first grasping member grasps a first glass sheet. The second grasping member grasps a second glass sheet. The second grasping member is aligned with the first grasping member via the alignment assembly. The second grasping member moves parallel to the Z-axis towards the first grasping member until the second glass sheet is attached to the first glass sheet.

However, during subsequent processes, the alignment assembly continually operates to ensure the exact position of the second glass sheet parallel to the X-axis and the Y-axis. This complicates the control system and operations of the vacuum laminator.

Therefore, there is room for improvement within the art.

BRIEF DESCRIPTION OF THE DRAWINGS

The components in the drawings are not necessarily drawn to scale, the emphasis instead being positioned upon clearly illustrating the principles of the present disclosure. Moreover, in the drawings, like reference numerals designate corresponding parts throughout the views.

DETAILED DESCRIPTION

Figure 1:
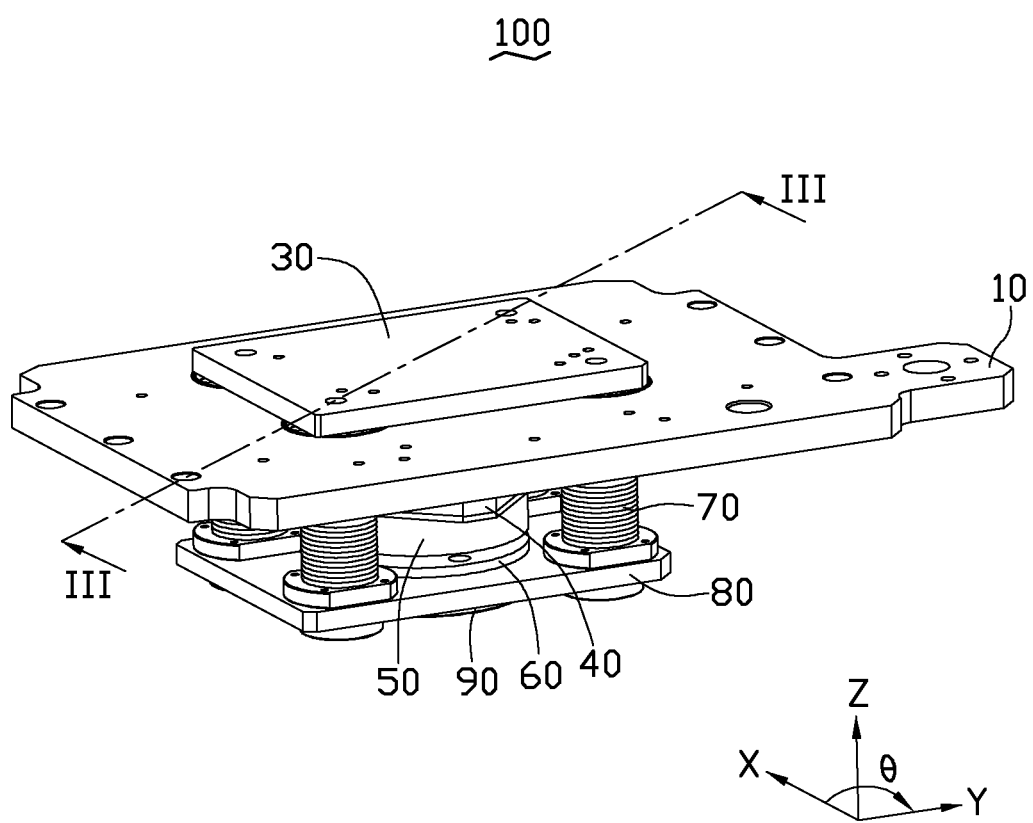
FIG. 1 is an isometric, assembled view of a first embodiment of a positioning device.
Figure 2:
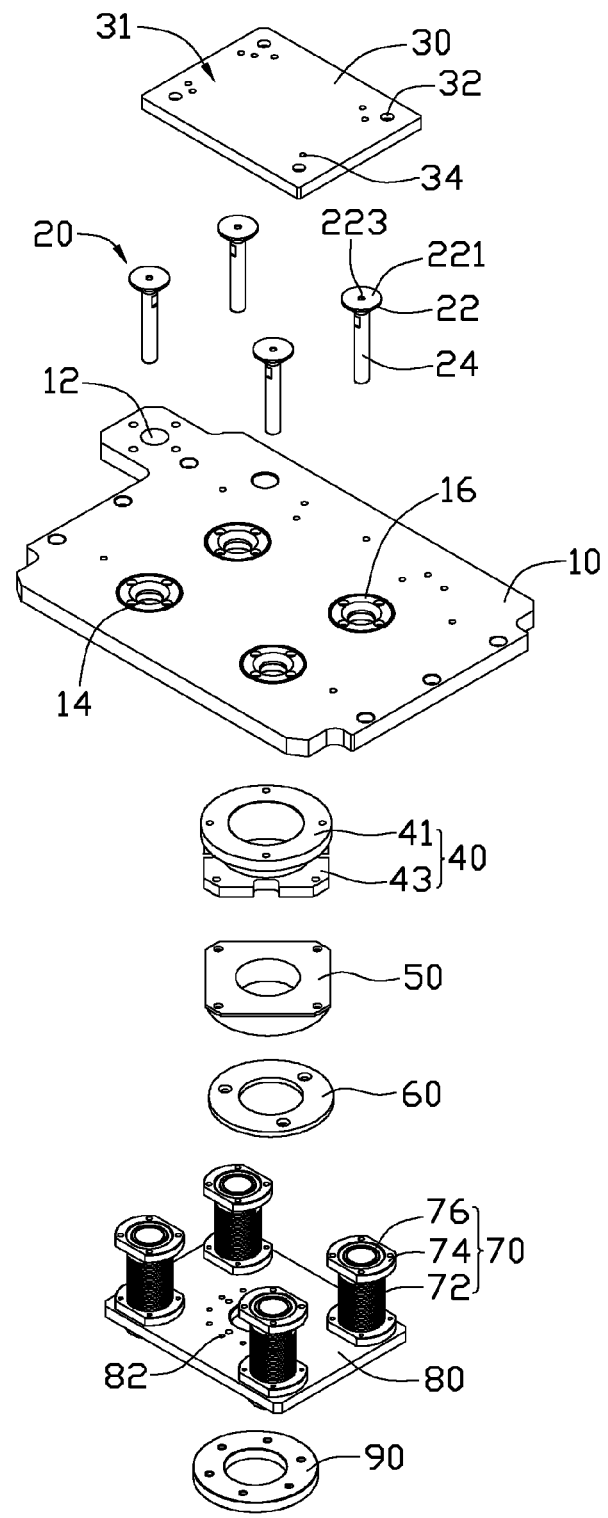
FIG. 2 is an exploded, isometric view of the positioning device of FIG. 1.

Referring to FIG. 1 and FIG. 2, a first embodiment of a positioning device 100 includes a base 10, a plurality of guide members 20, a supporting member 30, a connecting member 40, a first electromagnetic clutch 50, an engaging member 60, a plurality of flexible tubes 70, a fixing member 80, and a second electromagnetic clutch 90.

Figure 3:
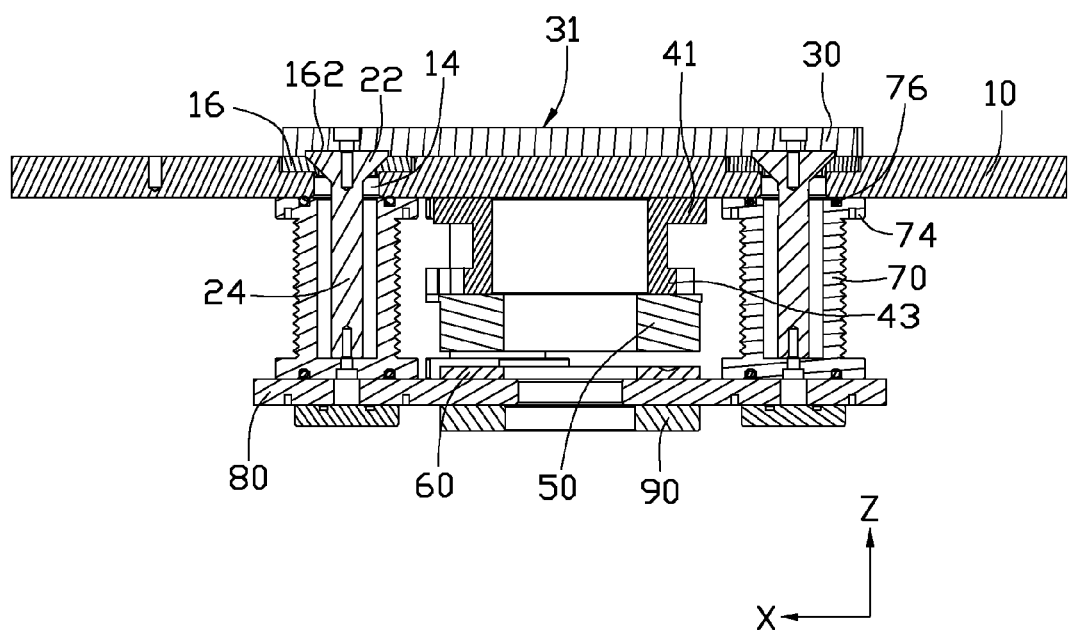
FIG. 3 is a cross-section of the positioning device of FIG. 1 taken along line III-III.
Figure 4:
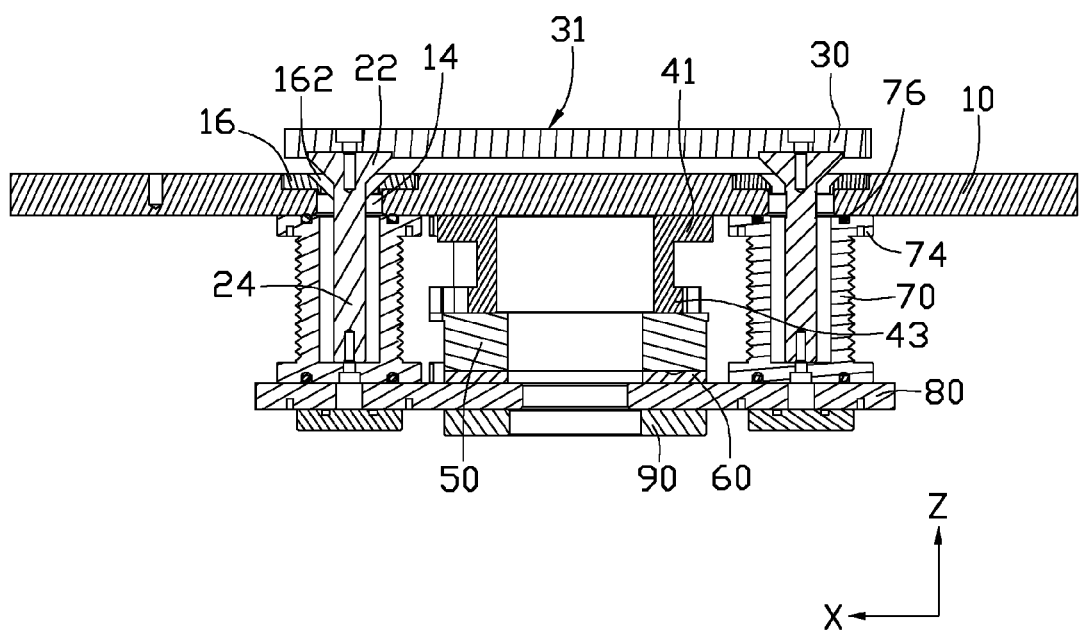
FIG. 4 is similar to FIG. 3, but viewed in another state.

Referring also to FIG. 3, the base 10 is a substantially planar board defining a locking hole 12 and four guide holes 14 aligned apart. The locking hole 12 is defined at a corner of the base 10 for fixing the base 10 to a fixed object, such as a vacuum laminator, so that the base 10 is stationary relative to the vacuum laminator. Each guide hole 14 is a stepped hole extending substantially perpendicular to and through the base 10. The base 10 further includes four washers 16, each defining a taper 162. Each washer 16 is received in an end of a guide hole 14 with a larger diameter.

Referring to FIG. 2 again, each guide member 20 includes a cap 22 and a shaft 24. The cap 22 is substantially frustoconical, corresponding in shape to the taper 162. The cap 22 includes an end surface 221 at an end of a larger diameter away from the shaft 24. The cap 22 defines a threaded hole 223 at the end surface 221. The shaft 24 is substantially cylindrical, and extends substantially perpendicular to the end surface 221 from an end of the cap 22 away from the end surface 221.

The supporting member 30 is a substantially rectangular board, and includes a supporting surface 31. The supporting member 30 defines four threaded holes 32 corresponding to the four guide holes 14 on the supporting surface 31. The supporting member 30 further defines a plurality of mounting holes 34 to fix the workpiece (not shown) to the supporting member 30.

The connecting member 40 is substantially cylindrical. The connecting member 40 includes a first connecting end 41 for fixing the connecting member 40 to the base 10, and a second connecting end 43 opposite to the first connecting end 41. The first electromagnetic clutch 50 is fixed to the second connecting end 43 of the connecting member 40.

The engaging member 60 is substantially annular. The engaging member 60 may be ferromagnetic or electromagnetic, so long as the engaging member 60 is capable of being attracted by the first electromagnetic clutch 50.

Each flexible tube 70 includes a main body 72, two connectors 74 connected to two opposite ends of the main body 72, and two seals 76. In the illustrated embodiment, the main body 72 is made of stainless steel. Each seal 76 is disposed at an end of one connector 74 away from the main body 72. The fixing member 80 is a substantially rectangular board defining a plurality of threaded holes 82. Two opposite ends of each flexible tube 70 are respectively fixed to the fixing member 80 and the base 10, with the flexible tube 70 being substantially perpendicular to the fixing member 80 and the base 10.

The second electromagnetic clutch 90 is configured to connect the fixing member 80 and an alignment assembly (not shown).

During assembly of the positioning device 100, the first connecting end 41 of the connecting member 40 is fixed to a center portion of a side of the base 10 away from the washers 16. The first electromagnetic clutch 50 is fixed to the second connecting end 43 of the connecting member 40. One connector 74 of each flexible tube 70 is fixed to the base 10 and corresponds to one guide hole 14 with the corresponding seal 76 disposed between the connector 74 and the base 10. The electromagnetic clutch 50 and four flexible tubes 70 are at the same side of the base 10. Another connector 74 of each flexible tube 70 is fixed to the fixing member 80 with the flexible tube 70 being substantially perpendicular to the fixing member 80 and the base 10. The corresponding seal 76 is disposed between the connector 74 and the fixing member 80. The engaging member 60 is fixed to the fixing member 80 by fasteners (not shown) engaged in the threaded holes 82, and corresponds to the first electromagnetic clutch 50. The engaging member 60 is at a side of the fixing member 80. The second electromagnetic clutch 90 is fixed to an opposite side of the fixing member 80. The shaft 24 of each guide member 20 is inserted into one flexible tube 70 from the taper 162 of the washer 16. An end of the shaft 24 away from the cap 22 abuts the fixing member 80, and the cap 22 is received in the taper 162. The end of the shaft 24 abutting the fixing member 80 is fixed thereto. The supporting member 30 is fixed to the caps 22 of the four guide member 20 with the end surfaces 221 abutting a surface of the supporting member 30 opposite to the supporting surface 31.

Referring to FIGS. 1 through 4, in use, the base 10 is fixed to an object to be positioned, and is substantially perpendicular to the Z-axis. A workpiece such as a second glass sheet to be attached to a first glass sheet (not shown), is positioned on the supporting surface 31. The fixing member 80 is connected to the alignment assembly by the second electromagnetic clutch 90. The fixing member 80 moves substantially parallel to the X-axis and the Y-axis, and rotates about the Z-axis direction by an angle θ indicated in FIG. 1, with the alignment assembly. The fixing member 80 moves substantially parallel to the Z-axis to bond the engaging member 60 with the first electromagnetic clutch 50 and compress the flexible tubes 70. Thus, the fixing member 80 is fixed to the base 10 with the engaging member 60 attracted by the first electromagnetic clutch 50. As a result, the position of the supporting member 30 fixed to the fixing member 80 by the guide members 20 does not change. The fixing member 80 is detached from the alignment assembly by shutting down the second electromagnetic clutch 90. The workpiece positioned on the supporting member 30 may be transported in subsequent processes without the relative position of the workpiece, the X-axis, or the Y-axis changing.

Figure 5:
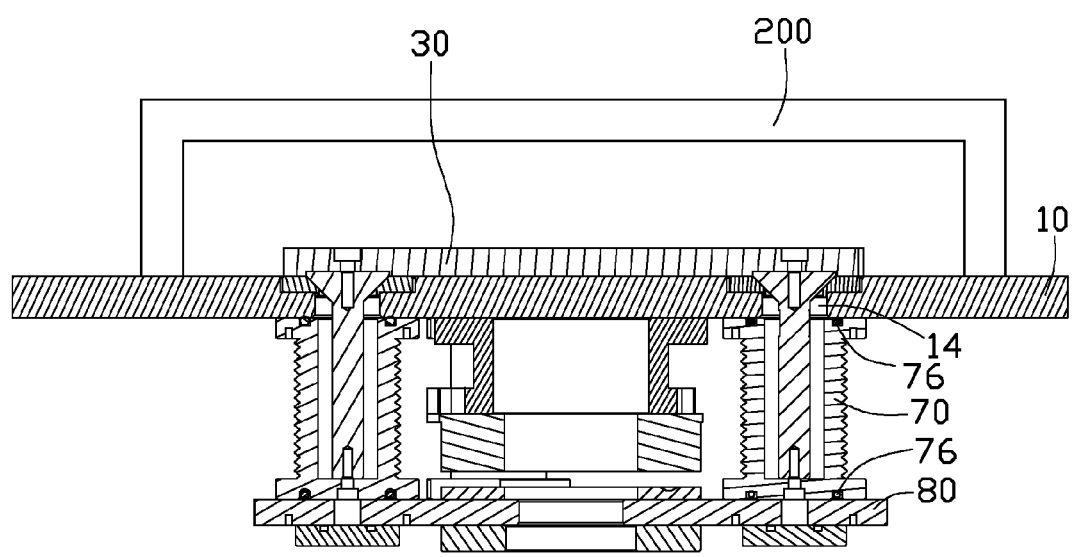
FIG. 5 is a cross-section of the positioning device of FIG. 1 applied in a vacuum laminator.

Referring to FIG. 5, the positioning device 100 is applied in an vacuum laminator including a vacuum covering 200 covering the supporting member 30. The vacuum covering 200 abuts a side of the base 10 away from the flexible tubes 70 such that a sealed space in which the supporting member 30 is received is defined by the base 10 and the vacuum covering 200. Two opposite ends of each flexible tube 70 are sealed to the base 10 and the fixing member 80 by the seals 76, so that the vacuum of the sealed space is ensured.

After the alignment of the workpiece positioned on the supporting member 30, the supporting member 30 is securely fixed to the base 10 via the first electromagnetic clutch 50 and the engaging member 60 to facilitate the subsequent process of the workpiece.

The positioning device 100 may be easily connected to the alignment assembly via the second electromagnetic clutch 90. In addition, the positioning device 100 may be applied in the vacuum laminator because two opposite ends of each flexible tube 70 are sealed to the base 10 and the fixing member 80.

Alternatively, the flexible tubes 70 may be omitted, whereby the positioning device 100 is applied under non-vacuum conditions. The second electromagnetic clutch 90 may be omitted, as long as the fixing member 80 is connected to the alignment assembly by a gripper or any other method. The connecting member 40 may be omitted, whereby the first electromagnetic clutch 50 is fixed to the base 10 directly.

Figure 6:
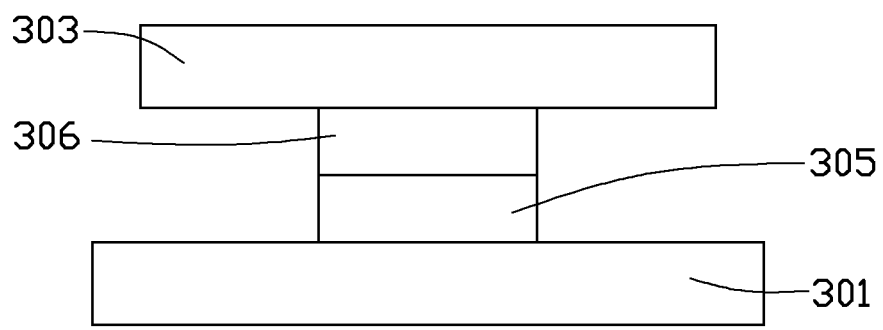
FIG. 6 is a schematic view of a second embodiment of a positioning device.

Referring to FIG. 6, a second embodiment of a positioning device 300 includes a base 301, a supporting member 303, an electromagnetic clutch 305, and an engaging member 306. The base 301 and the supporting member 303 are separated, with the electromagnetic clutch 305 and an engaging member 306 disposed therebetween. The electromagnetic clutch 305 is disposed on a side of the base 10 adjacent to the supporting member 303. The engaging member 306 is disposed on a side of the supporting member 303 adjacent to the base 10, and corresponds to the electromagnetic clutch 305. In the illustrated embodiment, the engaging member 306 contacts the electromagnetic clutch 305.

In use, the supporting member 303 is connected to an alignment assembly and the supporting member 303 is subjected to translation to adjust the position of the workpiece After the adjustment, the electromagnetic clutch 305 is electrified to attract the engaging member 306, causing the supporting member 303 to be fixed to the base 301.

Alternatively, the electromagnetic clutch 305 may be disposed on the supporting member 303, whereby the engaging member 306 is disposed on the base 301 corresponding to the electromagnetic clutch 305.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A positioning device, comprising:
a stationary base defining at least one hole;
a supporting member to support a workpiece;
a fixing member;
a first electromagnetic clutch;
an engaging member configured to be attracted by the first electromagnetic clutch; and
at least one guide member, wherein the supporting member and the fixing member are at opposite sides of the base, the first electromagnetic clutch is disposed on a side of the base adjacent to the fixing member, the engaging member is disposed on a side of the fixing member adjacent to the base and corresponds to the first electromagnetic clutch, an end of the at least one guide member is fixed to the fixing member, and an opposite end of the at least one guide member passes through the at least one hole and is fixed to the supporting member.

2. The positioning device of claim 1, further comprising at least one washer, wherein the guide hole is a stepped hole, the washer is received in the guide hole and sleeved on the at least one guide member.

3. The positioning device of claim 2, wherein the at least one washer defines a taper, the at least one guiding member comprises a cap and a shaft extending from the shaft, and the cap corresponds in shape to the taper.

4. The positioning device of claim 1, further comprising a connecting member interconnecting the base and the first electromagnetic clutch.

5. The positioning device of claim 1, further comprising at least one flexible tube sleeved on the at least one guide member, wherein two opposite ends of the at least one flexible tube are sealed to the base and the fixing member.

6. The positioning device of claim 5, wherein the flexible tube comprises a main body and two connectors connected to two opposite ends of the main body, and the two connectors are fixed to the base and the fixing member.

7. The positioning device of claim 6, wherein the at least one flexible tube further comprises two seals, one of the seals is disposed between the base and a corresponding connector, and the other one of the seals is disposed between the fixing member and the other corresponding connector.

8. The positioning device of claim 1, further comprising a second electromagnetic clutch disposed on a side of the fixing member opposite to the engaging member.

9. The positioning device of claim 1, wherein the engaging member is selected from the group consisting of a magnet, magnetically conductive material, and an electromagnet.

* * * * *